United States Patent
Knoblauch et al.

(10) Patent No.: US 8,636,113 B2
(45) Date of Patent: Jan. 28, 2014

(54) SHAFT ARRANGEMENT

(75) Inventors: Daniel Knoblauch, Untergruppenbach (DE); Wolfgang Eichhorn, Benningen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 6 days.

(21) Appl. No.: 13/298,145

(22) Filed: Nov. 16, 2011

(65) Prior Publication Data

US 2012/0129614 A1    May 24, 2012

(30) Foreign Application Priority Data

Nov. 17, 2010    (DE) .......................... 10 2010 052 310

(51) Int. Cl.
*F01M 11/02*    (2006.01)
(52) U.S. Cl.
USPC .............................. 184/11.2; 464/7; 384/473
(58) Field of Classification Search
USPC .............. 464/7, 17; 184/11.2, 13.1; 384/473, 384/474, 484
See application file for complete search history.

(56) References Cited

U.S. PATENT DOCUMENTS

| | | | |
|---|---|---|---|
| 1,645,504 A * | 10/1927 | Wright | 184/13.1 |
| 2,014,859 A | 9/1935 | Mitchell, Jr. | |
| 2,111,873 A * | 3/1938 | Sauer | 184/13.1 |
| 2,770,507 A * | 11/1956 | Ehnts | 384/474 |
| 3,021,182 A * | 2/1962 | Schnacke | 384/473 |
| 3,797,898 A | 3/1974 | Juichi | |
| 4,241,959 A * | 12/1980 | Frister | |
| 5,520,468 A | 5/1996 | Iguchi | |
| 5,975,533 A | 11/1999 | Hubbard et al. | |
| 7,118,324 B1 * | 10/2006 | Hinrichs et al. | 184/11.2 X |

FOREIGN PATENT DOCUMENTS

| | | |
|---|---|---|
| DE | 28 57 678 | 12/1980 |
| DE | 103 10 936 | 10/2004 |
| DE | 10 2006 012 001 | 9/2007 |
| EP | 0668 450 | 8/1995 |
| EP | 1 906 036 A2 | 4/2008 |
| JP | 61 140617 | 6/1986 |
| JP | 07 103 319 A | 4/1995 |
| JP | 2007 192309 | 8/2007 |
| WO | WO 80/01200 A1 * | 9/1980 |
| WO | WO 2008/031777 A1 | 3/2008 |

* cited by examiner

*Primary Examiner* — Gregory Binda
(74) *Attorney, Agent, or Firm* — Knobbe, Martens, Olson & Bear, LLP

(57) ABSTRACT

A shaft arrangement having a shaft and at least one component, which is arranged on the shaft and which is to be lubricated and/or cooled by a fluid. A fluid feed device being designed to feed the fluid to the shaft arrangement radially from outside. The component is a shaft sealing ring, which rests on the shaft and which is fixed to a housing. A baffle plate, which with the shaft sealing ring defines a fluid baffle chamber and which is separated by an annular gap from the outer circumference of the shaft, is arranged axially next to the shaft sealing ring. The fluid feed device is arranged so that fluid is fed into the fluid baffle chamber.

13 Claims, 2 Drawing Sheets

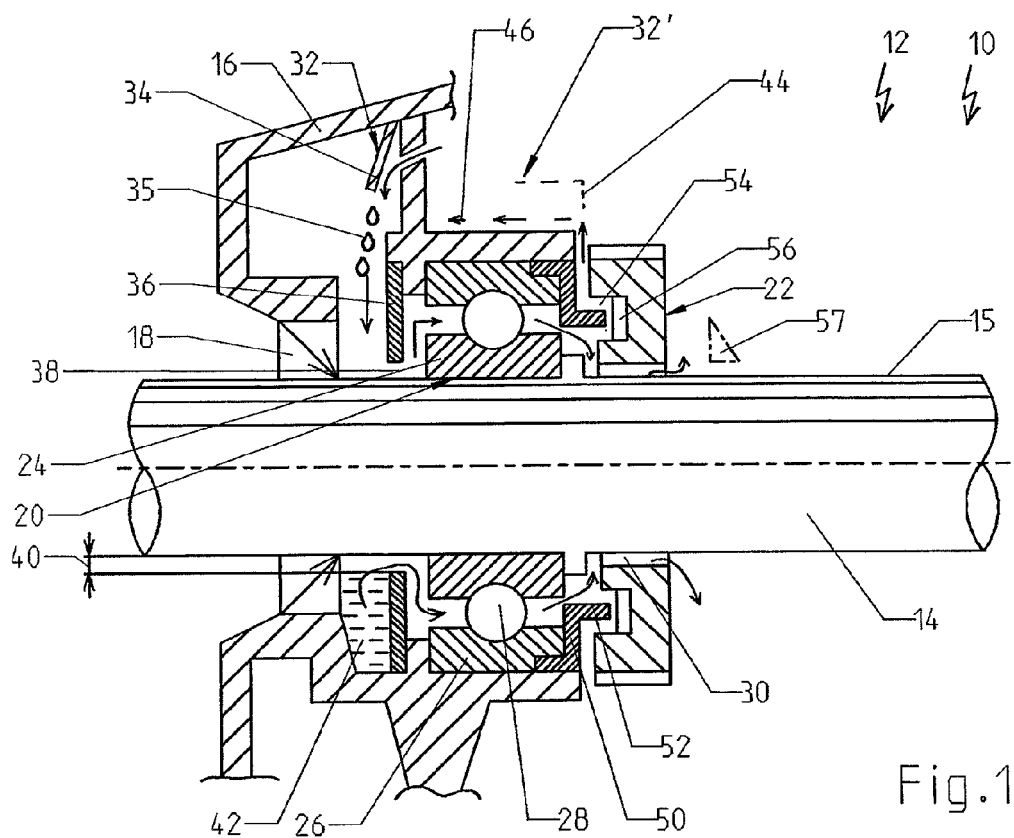
Fig. 1
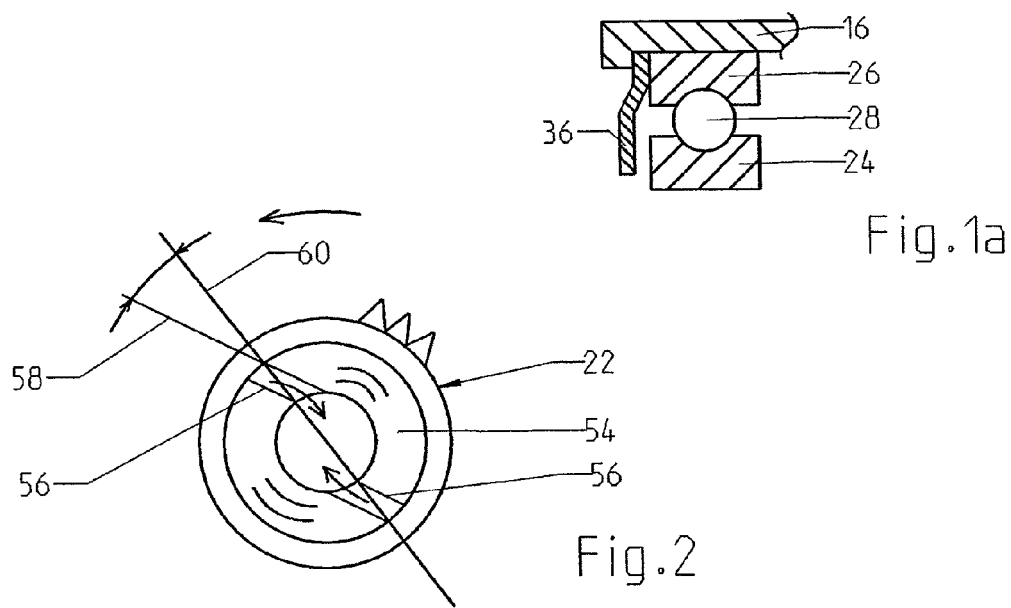
Fig. 1a
Fig. 2

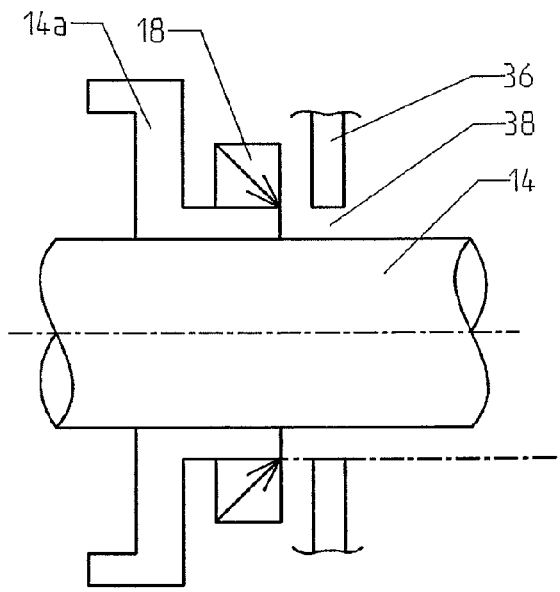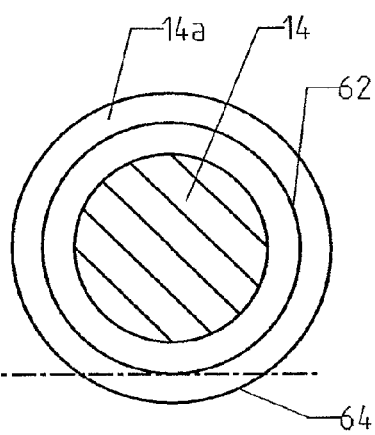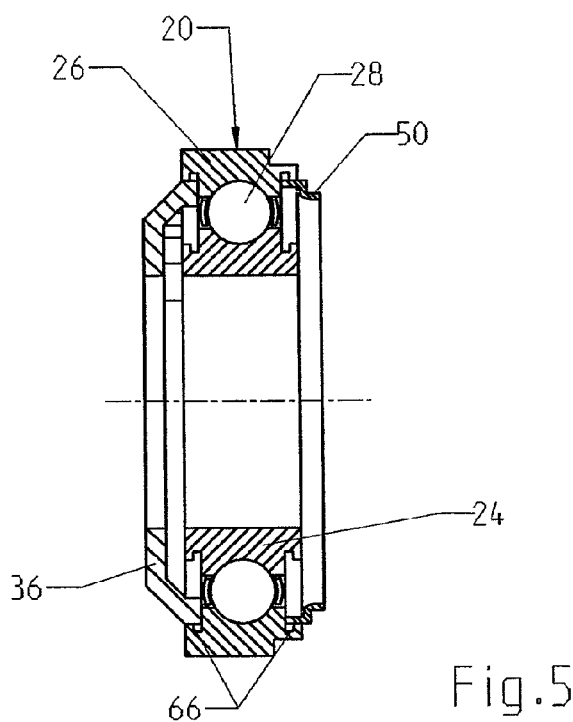

SHAFT ARRANGEMENT

CROSS-REFERENCE TO RELATED APPLICATIONS

This application claims the priority of German patent application DE 10 2010 052 310, filed Nov. 17, 2010.

BACKGROUND OF THE INVENTION

The present invention relates to a shaft arrangement, particularly for transmissions of motor vehicles, having a shaft and at least one component, which is arranged on the shaft and which is to be lubricated and/or cooled by means of a fluid, a fluid feed device being designed to feed the fluid to the shaft arrangement radially from outside.

The components arranged on such a shaft arrangement may be radial shaft sealing rings, rolling bearings, needle bearings or gear wheels, or synchromesh devices of synchromesh clutches, for example. So called injection lubrication is one known way of feeding fluid to such components. Here a fluid is fed axially via ducts in the shaft and fed to the respective components via corresponding radial apertures in the shaft. Such arrangements serve for feeding relatively large quantities of fluid. Since the fluid is generally fed radially outwards from inside, the fluid feed is generally directed by any centrifugal forces occurring.

In transmissions, on the other hand, a known method of supplying components with fluid is by so-called splash lubrication. Here a fluid sump is generally provided, into which rotating components such as gear wheels submerge and in so doing throw up fluid for fluid supply purposes.

With this fluid feed method it is difficult to feed fluid into the area close to the outer circumference of the shaft.

The fluid thrown radially outwards is generally caught by drip pans or the like and then returned either directly into the fluid sump or to a pump for the injection lubrication.

If the component to be supplied with fluid is a shaft sealing ring, it must be ensured that its sealing lip resting on the shaft does not run dry. Known forms of provision for this are grease deposits, for example, or so-called labyrinth seals.

If the component is an idle wheel, for example, it is generally likewise difficult to supply its idle wheel bearing with fluid by means of splash lubrication.

BRIEF SUMMARY OF THE INVENTION

In the light of this, an object of the invention is to specify an improved shaft arrangement, which in particular is capable of ensuring a good fluid feed to a respective component.

Such a fluid supply is preferably to be ensured even when the shaft is not rotating.

According to a first aspect of the invention the aforesaid object is achieved by a shaft arrangement, particularly for transmissions of motor vehicles, having a shaft and at least one component, which is arranged on the shaft and which is to be lubricated and/or cooled by means of a fluid, a fluid feed device being designed to feed the fluid to the shaft arrangement radially from outside, wherein the component is a shaft sealing ring, which rests on the shaft and which is fixed to a housing, a baffle plate, which with the shaft sealing ring defines a fluid baffle chamber and which is separated by an annular gap from the outer circumference of the shaft, being arranged axially next to the shaft sealing ring, and the fluid feed device being arranged so that fluid is fed into the fluid baffle chamber.

Here the fluid, which is necessary for the lubrication of the shaft sealing ring, accumulates in the fluid baffle chamber even when the shaft is stationary. The measure allowing the fluid to escape from the fluid baffle chamber substantially only via an annular gap serves to ensure that the fluid thereby comes into proximity with a sealing lip of the shaft sealing ring. This also allows the shaft sealing ring to be supplied with fluid immediately the shaft starts up from a state in which the shaft is stationary, so that any dry running is prevented.

It is generally feasible for the fluid baffle chamber to be incompletely sealed at the bottom in a gravitational direction. However, the leakage flow should be smaller than the oil feed flow by means of the fluid feed device.

It is particularly advantageous, however, for the fluid baffle chamber to be sealed at the bottom in a gravitational direction.

This ensures that said chamber is filled with fluid in all operating modes.

It is furthermore advantageous for the annular gap to have a width of less than two millimetres, in particular less than one millimetre.

It is thereby ensured that fluid is always present in sufficient proximity to the sealing lip of the shaft sealing ring.

It is also advantageous overall for the baffle plate to be arranged axially between the housing (and/or the shaft sealing ring) and a rolling bearing, in such a way that fluid flowing through the annular gap is fed to the rolling bearing.

This embodiment serves to ensure that the fluid flowing out of the fluid baffle chamber can be used for supplying the rolling bearing.

It is furthermore advantageous for the baffle plate to be fixed to the housing.

This affords a high degree of flexibility in the location and method of fixing.

It is particularly advantageous for the baffle plate to be fixed between the housing and a rolling bearing.

For example, the baffle plate here may be arranged in the area of the bearing seat, in particular between a bearing outer ring of the rolling bearing and housing flange intended for the axial fixing thereof.

The baffle plate can thereby be fixed both radially and axially.

According to a further preferred embodiment the baffle plate is fixed in the area of an inner circumference of an outer ring of a rolling bearing.

This obviates the need for special measures for fixing to the housing. Furthermore, many rolling bearings already have recesses in the area of the inner circumference of the outer ring, for clipping in sealing rings. The baffle plate is therefore preferably inserted into a groove, intended for this purpose, in the area of the inner circumference of the outer ring. In this embodiment a standard rolling bearing with sealing ring recesses may be used as rolling bearing.

According to a second aspect, which may be combined with the first aspect, there is provided a shaft arrangement, particularly for transmissions of motor vehicles, having a shaft and at least one component, which is arranged on the shaft and which is to be lubricated and/or cooled by means of a fluid, a fluid feed device being designed to feed the fluid to the shaft arrangement radially from outside, wherein the component is a rolling bearing, which comprises an inner ring arranged on the shaft, and an outer ring, the outer ring being connected to a fluid ducting sleeve, which comprises a fluid ducting portion extending radially away from the rolling bearing.

Here fluid emerging from the rolling bearing can be retained radially by means of the fluid ducting sleeve, in such a way that the fluid, on flowing out of the rolling bearing, is not immediately expelled radially outwards by centrifugal forces of the like.

Accordingly, in this embodiment provision can be made for supplying a further component, arranged next to the rolling bearing, with fluid.

The fluid ducting sleeve is preferably arranged on that axial side of the rolling bearing, which is remote from the shaft sealing ring.

In this embodiment it is furthermore preferred if the baffle plate is arranged between the shaft sealing ring and the rolling bearing according to the first aspect.

According to a preferred embodiment the fluid ducting sleeve is fixed in the area of an outer circumference of the outer ring.

Here the fluid ducting sleeve may be firmly clamped between the outer ring and a housing portion, for example.

Alternatively, however, it is especially preferred if the fluid ducting sleeve is fixed in the area of an inner circumference of the outer ring.

This obviates the need for modifications to the outer circumference of the outer ring. Furthermore, many rolling bearings already have recesses in the area of the inner circumference of the outer ring, for clipping in sealing rings. The fluid ducting sleeve is preferably inserted into a groove, intended for this purpose, in the area of the inner circumference of the outer ring.

With this measure a standard rolling bearing can consequently be used as rolling bearing.

In the second aspect of the invention it is furthermore advantageous for a further component, which has an axial recess, into which the fluid ducting portion projects, to be axially supported next to the rolling bearing.

The fluid emerging from the rolling bearing can hereby be ducted in an axial direction by means of the fluid ducting sleeve right up to the further component.

According to a third aspect of the invention, which may be combined with the first and/or the second aspect, there is provided a shaft arrangement, particularly for transmissions of motor vehicles, having a shaft and at least one component, which is arranged on the shaft and which is to be lubricated and/or cooled by means of a fluid, a fluid feed device being designed to feed the fluid to the shaft arrangement radially from outside, wherein the component, particularly the further component, has at least one fluid delivery groove in the area of the axial recess, the groove being formed and oriented so that as the component rotates the groove delivers fluid from the axial recess radially, in particular radially inwards.

It is possible here for the fluid entering the axial recess to be delivered radially as the component rotates, and in particular radially inwards, that is to say counter to the centrifugal force.

This makes it possible also to supply portions situated radially further inwards with fluid.

It is particularly advantageous here for the fluid delivery groove to be formed as a generally radially oriented groove, the delivery axis of which is angled relative to a radial direction originating from the centre of the shaft.

In this embodiment the fluid delivery groove is consequently able to deliver the fluid radially inwards in the direction of rotation, that is to say in opposition to the centrifugal forces.

On the whole, it is further preferred here if the further component is an idle wheel, which is rotatably supported on the shaft by means of an idle wheel bearing, in such a way that fluid delivered by means of the fluid delivery groove is fed to the idle wheel bearing. The fluid can then consequently be fed from the rolling bearing via the fluid ducting sleeve and the fluid delivery groove into the idle wheel bearing or a needle bearing. On emerging at the other axial end, the fluid can then be fed to a clutch, assigned to the idle wheel, for example, in particular a synchromesh clutch, in order, for example to supply friction rings (taper rings) present therein with fluid.

The present invention also relates to a vehicle transmission having such a shaft arrangement.

Overall, therefore, the invention allows a fluid feed radially from outside, making it possible to supply the fluid in succession to multiple components, which are arranged axially side by side.

Here the fluid supply is substantially unchanged, irrespective of whether or not the shaft is rotating. However, for the supply of fluid it may be necessary for an idle wheel arranged on the shaft to be turning, so that fluid can be fed to the fluid baffle chamber from a collecting device.

Overall, therefore, the present invention is capable of providing a comprehensive fluid supply concept for shaft sealing rings, bearings, idle wheels, synchromesh rings and shift fork claws. Separately driven means of delivery such as pumps, turbine blades or the like are not necessary here. The invention can consequently be implemented using few components.

The shaft arrangement can be used in a conventional vehicle transmission. In this case the shaft may be designed as a solid shaft. If the shaft of the shaft arrangement is designed as a hollow shaft, the cavity situated therein may be designed as a "dry space".

The present shaft arrangement is therefore particularly suitable for use where a further shaft, which of necessity must be dry-running, is led through the hollow shaft. This is the case, for example, with so-called range-extenders, when a dry-running shaft led through the hollow shaft connects an alternator to an internal combustion engine, for example.

In this case a two or more-stage transmission may be arranged on the hollow shaft.

It goes without saying that the aforementioned features and those yet to be explained below can be used not only in the particular combination specified, but also in other combinations or individually, without departing from the scope of the present invention.

BRIEF DESCRIPTION OF THE SEVERAL VIEWS OF THE DRAWING

Exemplary embodiments of the invention are represented in the drawing and are explained in more detail in the following description. In the drawing:

FIG. 1 shows a schematic longitudinal sectional view through a shaft arrangement according to one embodiment of the invention;

FIG. 1a shows a schematic longitudinal sectional view through a part of a shaft arrangement according to a modification of the embodiment shown in FIG. 1;

FIG. 2 shows a schematic plan view in an axial direction of an idle wheel of a shaft arrangement according to the invention;

FIG. 3 shows a schematic view of an alternative embodiment of a shaft arrangement according to the invention;

FIG. 4 shows a schematic axial plan view of the shaft arrangement in FIG. 3; and FIG. 5 shows a longitudinal sectional view through a shaft bearing of an alternative embodiment of a shaft arrangement according to the invention

DETAILED DESCRIPTION OF THE INVENTION

In FIG. 1 a transmission is generally denoted by 10. The transmission comprises a shaft arrangement 12. The shaft arrangement comprises a shaft 14 having a generally closed outer circumference. The shaft 14 may be designed as a solid shaft or as a hollow shaft, it being possible in the case of a hollow shaft to design the interior space as a dry space.

The transmission 10 further comprises a housing 16, on which the shaft 14 is supported.

A radial shaft sealing ring 18 is provided for sealing an outlet area of the shaft 14 from the housing. The shaft arrangement 12 further comprises a shaft bearing in the form of a rolling bearing 20 arranged axially next to the shaft sealing ring 18. The shaft arrangement 12 further comprises an idle wheel 22 arranged next to the rolling bearing 20.

The rolling bearing 20 comprises an inner ring 24 firmly connected to the shaft 14, and an outer ring 26, which is fixed to the housing 16. A plurality of rolling elements 28 (for example balls) is arranged between the inner ring 24 and the outer ring 26.

The idle wheel 22 is rotatably supported on the shaft 14 by means of an idle wheel bearing in the form of a needle bearing 30.

The shaft arrangement 12 is supplied with fluid by means of a fluid feed device 32. Here the fluid is supplied radially inwards from outside. For this purpose a draining web 34, for example, from which the fluid 35 that has been thrown up drains on to the shaft under gravitational forces, may be formed on the housing 16.

A baffle plate 36 is arranged between the shaft sealing ring 18 and the rolling bearing 20. The baffle plate 36 is fixed to the housing 16. The baffle plate 36 has a circular aperture, through which the shaft 14 is led. An annular gap 38 is provided between the inner circumference of the aperture in the baffle plate 36 and the outer circumference 15 of the shaft 14. The annular gap has a gap width 40, which is preferably very small, in particular with a width of less than two millimetres, and preferably with a width of less than one millimetre.

The baffle plate 36 is sealed off in relation to the housing 16, so that a fluid baffle chamber 42 is created between the shaft sealing ring 18 and the baffle plate 36. The fluid feed device 32 is arranged so that the fluid 35 fed passes into the fluid baffle chamber 42 where it collects, at least up to the level of the recess in the baffle plate 36.

The fact that the gap width 40 of the annular gap 38 is very small ensures that a sealing lip of the shaft sealing ring 18 resting on the outer circumference 15 of the shaft 14 is always sufficiently wetted with fluid, even when the shaft 14 is not rotating or is rotating at very high speeds. Consequently when the shaft 14 starts turning it is thereby possible to prevent dry running; in addition it is possible to prevent dry running at high speeds.

The fluid emerging in an axial direction from the fluid baffle chamber 42 via the annular gap 38 passes into a space between the baffle plate 36 and the rolling bearing 20. The fluid is consequently led into the area between the inner ring 24 and the outer ring 26 and therefore also serves for the fluid supply of the rolling bearing 20.

An alternative fluid feed device 32' is represented schematically at 44. This device may comprise a fluid-deflecting plate 44, which is arranged axially in the area between the rolling bearing 20 and the idle wheel 22, but radially outside the rolling bearing 20. The fluid-deflecting plate 44 serves to catch fluid, particularly that emerging from the area of a toothed engagement of the idle wheel 22 with an intermeshing gear wheel. The fluid caught by the fluid-deflecting plate 44 can then be led through a schematically indicated fluid duct 46 to the area from whence the fluid 35 passes into the fluid baffle chamber 42.

The fluid from the area between the shaft sealing ring and the baffle plate 36 entering the rolling bearing 20 emerges from the rolling bearing 20 on the axially opposite side. On this side a fluid ducting sleeve 50 is fitted to the rolling bearing 20. In this embodiment the fluid ducting sleeve 50 is fixed in the area of an outside diameter of the outer ring 26 and comprises a fluid ducting portion 52 extending axially away from the rolling bearing 20. The fluid ducting portion 52 prevents fluid emerging from the rolling bearing 20 being thrown radially outwards.

An axial recess 54 is formed in the adjacent idle wheel 22. The fluid ducting portion 52 extends into the axial recess, so that the fluid passes into the axial recess 54. The fluid ducting portion 52 consequently bridges the axial distance between the rolling bearing 20 and the axial recess 54.

A plurality of fluid delivery grooves 56 is formed at the axial base of the axial recess 54. These grooves are formed and oriented so that as the idle wheel 22 rotates they deliver the fluid passing into the axial recess 54 radially inwards.

As a result, the fluid passes into the area of the idle wheel bearing 30 and enters this in an axial direction. The fluid emerges from the idle wheel bearing 30 on the axially opposite side.

On the fluid outlet side a guide sleeve 57 (as indicated schematically in FIG. 1) of a clutch pack may be arranged laterally next to the idle wheel 22. The clutch pack may take the form of a synchromesh clutch pack, for example. The fluid emerging from the idle wheel bearing 30 is then consequently drained off radially outwards in the area between the idle wheel 22 and the guide sleeve 57, where it may serve for lubricating the clutch arrangement, particularly its synchromesh unit or the gearshift sleeve and shift forks connected thereto, etc.

FIG. 1*a* shows a modification of the embodiment shown in FIG. 1, a baffle plate 36 being fixed between the housing 16 and the outer ring 26 of the rolling bearing 20. To be more precise, the baffle plate 36 is positioned in the housing bearing seat between the rolling bearing 20 and the housing flange intended for axially fixing the bearing outer ring 26 (and hence the bearing). The baffle plate 36 is thereby fixed radially via the bearing seat and is fixed axially between the rolling bearing 20 and the housing flange. Here an adequate sealing of the fluid baffle chamber 42 (not shown in FIG. 1*a*) can be achieved, for example, by means of the axial force from the axially preloaded shaft bearing.

FIG. 2 shows a schematic plan view of an exemplary embodiment of an idle wheel 22. It can be seen that two diametrically opposing fluid delivery grooves 56 are formed in the recess 54. These grooves have a delivery axis 58, which is angled relative to a radial direction 60 originating from the centre of the shaft 14. The angle between the delivery axis 58 and the radial direction 60 may lie in the range between 3° and 80°, for example.

As the idle wheel 22 rotates (in a preferred direction of rotation), this oblique position of the fluid delivery grooves 56 affords a radial delivery direction radially inwards in the area of the axial recess 54.

FIGS. 3 and 4 show an alternative embodiment of a shaft arrangement. In terms of its construction and mode of operation this corresponds generally to the shaft arrangement in FIG. 1. The same elements are therefore provided with the same reference numerals. It is largely the differences that will be explained below.

In the embodiment in FIGS. 3 and 4 the shaft sealing ring 18 is arranged on a component 14*a* connected to the shaft 14, so that the sealing lip of the shaft sealing ring 18 lies radially outside an inner circumference of the recess in the baffle plate

36. Consequently in this embodiment a permanent wetting of the sealing lip of the shaft sealing ring 18 can be ensured due to the outer circumference 64 of the component 14*a* situated radially further outwards (compared to the inner circumference 62 of the recess in the baffle plate 36).

FIG. 5 shows an alternative embodiment of a rolling bearing 20, in which the fluid ducting sleeve 50 is not fitted in the area of the outer circumference of the outer ring 26, but in the area of the inner circumference of the outer ring 26. To be more precise, the fluid ducting sleeve 50 can be inserted into a sealing ring recess 66 of the outer ring 26.

FIG. 5 further shows an alternative possibility for fixing the baffle plate 36 described above. As is shown in FIG. 5, the baffle plate may also be designed so that it is fixed in the area of the inner circumference of the outer ring 26. In particular, it is possible to insert the baffle plate 36 into a sealing ring recess 60 of the outer ring 26.

The invention claimed is:

1. Shaft arrangement comprising:
a shaft, and
at least one component, which is arranged on the shaft and which is to be at least one of lubricated and cooled by means of a fluid,
a fluid feed device being designed to feed the fluid to the shaft arrangement radially from outside,
wherein the component has an axial recess, the axial recess having a recess bottom surface which is arranged in a radial direction, the fluid fed to the shaft arrangement is further fed into the axial recess, wherein the component has at least one fluid delivery groove formed in the recess bottom surface of the axial recess, the fluid delivery groove being formed and oriented so that as the component rotates the groove delivers fluid from the axial recess radially, and wherein the groove is formed and oriented such that fluid is delivered radially inwards.

2. Shaft arrangement comprising:
a shaft, and
at least one component, which is arranged on the shaft and which is to be at least one of lubricated and cooled by means of a fluid,
a fluid feed device being designed to feed the fluid to the shaft arrangement radially from outside,
wherein the component has an axial recess, the axial recess having a recess bottom surface which is arranged in a radial direction, the fluid fed to the shaft arrangement is further fed into the axial recess, wherein the component has at least one fluid delivery groove formed in the recess bottom surface of the axial recess, the fluid delivery groove being formed and oriented so that as the component rotates the groove delivers fluid from the axial recess radially, wherein the fluid delivery groove is formed as a generally radially oriented groove, the delivery axis of which is angled relative to a radial direction originating from the centre of the shaft.

3. Shaft arrangement comprising:
a shaft, and
at least one component, which is arranged on the shaft and which is to be at least one of lubricated and cooled by means of a fluid,
a fluid feed device being designed to feed the fluid to the shaft arrangement radially from outside,
wherein the component has an axial recess, the axial recess having a recess bottom surface which is arranged in a radial direction, the fluid fed to the shaft arrangement is further fed into the axial recess, wherein the component has at least one fluid delivery groove formed in the recess bottom surface of the axial recess, the fluid delivery groove being formed and oriented so that as the component rotates the groove delivers fluid from the axial recess radially, wherein the component is an idle wheel, which is rotatably supported on the shaft by means of an idle wheel bearing, in such a way that fluid delivered by means of the fluid delivery groove is fed to the idle wheel bearing.

4. Shaft arrangement, comprising:
a shaft,
a first component which is arranged on the shaft and which is connected to a fluid ducting portion projecting in an axial direction,
a second component which is arranged on the shaft, the second component being arranged axially adjacent to the first component on the side of the fluid ducting portion and having an axial recess,
wherein the first and the second components are consecutively to be at least one of lubricated and cooled by means of a fluid,
a fluid feed device being designed to feed the fluid to the shaft arrangement radially from outside,
wherein the axial recess has a recess bottom surface which is arranged in a radial direction, the fluid fed to the shaft arrangement is further fed into the axial recess,
wherein the fluid ducting portion of the first component projects into the axial recess of the second component, and
wherein the second component has at least one fluid delivery groove formed in the recess bottom surface of the axial recess, the groove being formed and oriented so that as the second component rotates the groove delivers fluid from the axial recess radially.

5. Shaft arrangement according to claim 4, comprising, a shaft sealing ring, which rests on the shaft and which is fixed to a housing, wherein a baffle plate, which with the shaft sealing ring defines a fluid baffle chamber and which is separated by an annular gap from the outer circumference of the shaft, is arranged axially next to the shaft sealing ring, and wherein the fluid feed device is arranged so that fluid is fed into the fluid baffle chamber.

6. Shaft arrangement according to claim 5, wherein the fluid baffle chamber is sealed off at a bottom of the fluid baffle chamber in a gravitational direction.

7. Shaft arrangement according to claim 6, wherein the annular gap has a width of less than 2 mm.

8. Shaft arrangement according to claim 5, wherein the baffle plate is arranged axially between the housing and a rolling bearing, in such a way that fluid flowing through the annular gap is fed to the rolling bearing.

9. Shaft arrangement according to claim 5, wherein the baffle plate is fixed to the housing.

10. Shaft arrangement according to claim 5, wherein the baffle plate is fixed between the housing and a rolling bearing.

11. Shaft arrangement according to claim 5, wherein the baffle plate is fixed in the area of an inner circumference of an outer ring of a rolling bearing.

12. Shaft arrangement according to claim 4, wherein the fluid ducting sleeve is fixed in an area of an outer circumference of an outer ring.

13. Shaft arrangement according to claim 4, wherein the fluid ducting sleeve is fixed in an area of an inner circumference of an outer ring.

* * * * *